Oct. 18, 1966    H. R. BROWN    3,279,124
CORNER PORTIONS FOR ELASTOMER GASKETS
Filed July 20, 1964
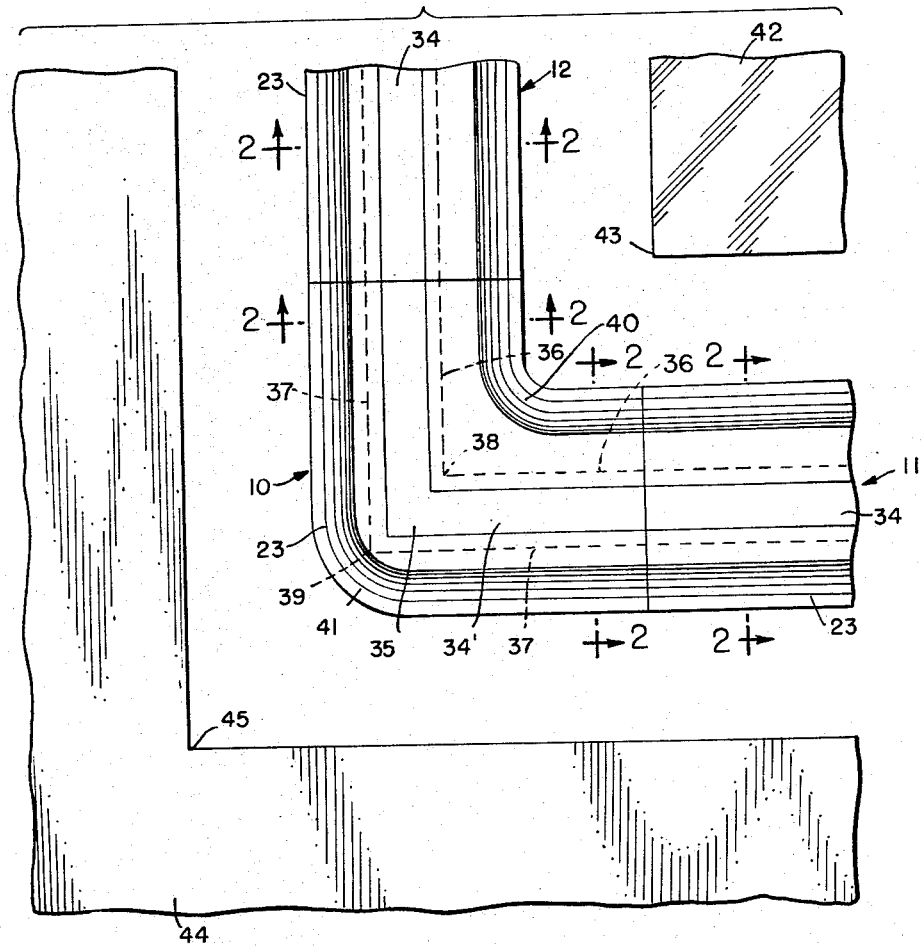
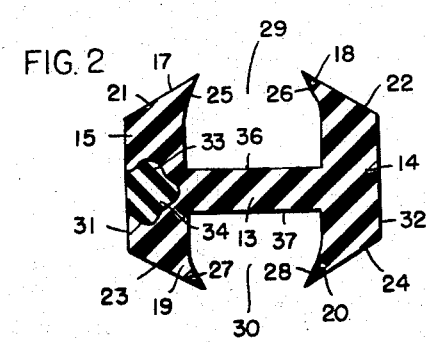
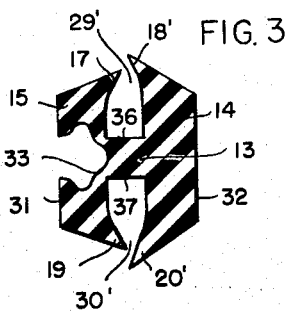
INVENTOR:
HOWARD R. BROWN

United States Patent Office 3,279,124
Patented Oct. 18, 1966

3,279,124
CORNER PORTIONS FOR ELASTOMER GASKETS
Howard R. Brown, Bowling Green, Ohio, assignor to The D. S. Brown Company, North Baltimore, Ohio, a corporation of Ohio
Filed July 20, 1964, Ser. No. 383,688
2 Claims. (Cl. 49—479)

This invention pertains to elastomer gaskets for the mounting of plate-like members, such as panels, strips and the like, and has more particular reference to improvements in elastomer gasket corner portions for sealing corners of panel-like members. The invention is especially useful in sealing right angle corners, but other angles, including obtuse angle corners, are contemplated.

Briefly, the invention pertains to elastomer gasket members having a pair of legs substantially at an angle to each other. Each leg is of generally H-shaped, transverse cross-section, which cross-section is defined by a pair of parallel side webs and a cross web. These webs define oppositely outwardly facing slots adapted to receive a respective inside and outside corner of two, panel-like members mounted in the respective slots of opposite sides of the gasket member. The gasket member forms a liquid-tight seal between itself and the inserted panel-like members.

The corner portions of gaskets of the invention have the cross webs of the respective legs intersecting at a substantially sharp, right angle to form a right angle seat for inside or outside corners of the panel-like members. The side webs have inwardly sloping, outer wall portions along their longitudinal edges to provide relatively sharp-edged lips at the outer edges of the aforesaid slots. The said outer wall portions of the legs at the intersections thereof are curved, as viewed in side elevation, around the corner formed at the intersection to provide radius curves along the longitudinal edges of the side webs at the intersections.

The aforesaid lips preferably project diagonally toward each other at the outer edges of the slots, and the outer wall of one of the side webs has a lobed-walled slot with a corner at the intersection of the two legs of the gasket. This slot is adapted to receive a removable, matingly-lobed zipper strip made of a relatively hard elastomer. The function of the zipper strip, which is inserted in the slot after the panel members have been mounted in the gasket, is to exert pressure along all of the sealing edges between the gasket and the panel-like members to effect a tight seal.

The structural type gaskets of the invention constitute improvements in the area of gaskets referred to in industry as "Zipper wall gaskets." The structural gaskets heretofore known have employed corner portions in which the legs define sharp, 90° intersections without the radius curves heretofore described. These structures did not completely solve the problem of providing a leak-proof seal at the corners. It has been found, however, that the utilization of the radius curves as aforedescribed in accordance with the invention results in a uniformly tight seal, after the corner piece of the zipper strip is inserted, by pressure developed from insertion of the corner piece and exerted out through the radii, eliminating the heretofore encountered problems resulting from wrinkling or decrease of pressure at the corners and resultant leakage of the seal.

It is, accordingly, a primary object of this invention to provide improvements in corner gasket structures for effecting a tight seal between the lips of an elastomer sealing strip having said corner portion and the corner of a panel-like member mounted therein. Another object of the invention is to provide improvements in elastomer gasket corner portions for zipper wall gasket structures.

Still another object of the invention is to provide improvements in structural gasket corner portions of substantially H-shaped transverse cross-section for the intersecting legs of the gasket through the utilization of radius curves in the outer wall portions of the side web to effect a uniform pressure between lips formed at said outer wall portions and panel-like members inserted in the slots of the corner portions of substantially H-shaped cross-section.

A more specific object of the invention is to provide corner portions for gaskets as aforedescribed embodying a lobed-walled slot in the outer wall of one of the side webs with a right angle corner in said slot at the intersection of the legs of the corner gasket, which slot is adapted to receive a matingly-lobed, zipper strip, corner member for exerting pressure between the lips and the inserted, panel-like members.

Another specific object of the invention is to provide a greater (higher) pressure along the edges of the H-shaped gasket through the lips which project diagonally toward each other at the outer edges of the slots not only to afford a tight liquid seal but also to assure greater resistance to blow out during periods of high wind velocity.

The foregoing and other important objects, advantages and inherent functions of the invention will become apparent as the same is more fully understood from the following description, which, taken in connection with the accompanying drawings, discloses preferred embodiments of the invention.

Referring to the drawings:

FIG. 1 is a side elevation of an elastomer gasket corner portion in association with adjoining, elongated seal strips, shown in fragment, and two panel-like members, in exploded view, having respective inside and outside right angle corners;

FIG. 2 is a transverse section of either of the legs of the corner portion of the gasket member and also the aforesaid elongated seal strips taken on any one of the section planes 2—2 of FIG. 1, and;

FIG. 3 is a transverse section similar to the section of FIG. 2 of a modified form of the corner portion of the gasket and elongated seal strip members.

Referring to the drawings, FIG. 1 shows a corner portion 10 and the adjoining portions of elongated, elastomer seal strips 11 and 12. The elastomer seal strips 11 and 12 can be made conveniently as elastomer extrusions, but the corner portion 10 is not structurally adapted for extrusion and, accordingly, is most conveniently made by molding. For this purpose, a corner mold is employed, into the ends of which may be inserted the ends of the strips 11 and 12. The strips 11 and 12 thus form two side walls of the mold. The mold is then filled with a suitable elastomer molding composition, and the composition is cured to form the corner portion and also unite the corner portion with the ends of the strips 11 and 12.

The transverse sections fo the corner portion 10 and the strips 11 and 12 are essentially identical. These transverse sections define a substantially H-shape formed by a cross web 13 and side webs 14 and 15.

The outer, longitudinal edges of the side webs 14 and 15 have tapered lips 17, 18, 19 and 20 which, in pairs, slope in a direction toward each other. The aforesaid lips are formed between the diagonal outer walls 21, 22, 23 and 24 and the diagonal inner walls 25, 26, 27 and 28, respectively, of the outwardly facing slots 29 and 30. The panel-like members are inserted into the slots 29 and 30. The width of the slots 29 and 30 is such that the inserted panels bend or deform the lips 17–20 outwardly so that these lips exert a resilient, sealing pressure against the sides of the panel-like members.

The outer faces 31 and 32 of the side webs 15 and 14, respectively, are at right angles to the plane of the center web 13. The surface 31 has, opposite the web 13, a lobed-walled slot 33 into which fits a removable, matingly-lobed, zipper strip member 34. The zipper strip member is an elastomer member made of a relatively hard elastomer. It is removed from the slot 33 when the panel-like members are inserted into slots 29 and 30. The slot 33 allows the portions of the side web 15 to be bent outwardly to facilitate insertion of the panel-like members in the slots 29 and 30. After the panel-like members are seated in the slots, the zipper strip 34 is inserted into the slot 33. This relatively hard elastomer strip causes pressure to be exerted by the lips 17–20 against the panel-like members, thus effecting the seal.

The corner zipper strip 34' is essentially the same as the heretofore described zipper strip 34, the latter being an elongated strip inserted in the elongated seal members 11 and 12. The corner zipper strip 34', however, has a right angle corner 35 at the juncture of the two legs of the corner strip 34'. The pressure developed upon insertion of the lobed, corner strip 34', even though it and the slot 33 into which it is inserted have right angle corners, develops pressure in the corner portion 10 exerted out through the radius corners 40 and 41 to give a sealing pressure between the lips at the corners 40 and 41 against the corners of the panel-like members with no wrinkling or decrease of pressure which would allow leakage.

The assembly of the gasket seal and the panel-like members will be understood from FIG. 1 wherein a panel-like member 42, e.g., a glass plate with an outside, square corner 43, is inserted into the slot 29 until the edges of the panel-like member 42 seat against the lower surfaces 36 of the slots 29 in the seal members 10, 11 and 12 with the corner 43 positioned against the inside corner 38 of the slot 29 of the corner portion 10. A second panel-like member 44 having an inside, square corner 45 is inserted in the slot 30 with the edge of the panel-like member 44 against the walls 37 of the slots 30 of the gasket seal members 10, 11 and 12. The inside corner 45 lies against the outside corner 39 of the right angle slot 30 in the corner gasket 10. Upon insertion of the zipper strips 34 and the corner strip 34', a tight seal is effected between the sides of the panel-like members and the aforesaid lips of the gasket members.

The embodiment of FIG. 3 illustrates a variation in the H-shaped cross-section for the corner portion 10 and the gasket strips 11 and 12. In most details, the embodiment of FIG. 3 is essentially the same as the embodiment of FIGS. 1 and 2, and, where applicable, like numerals designate like parts. The essential difference between the embodiments is that the embodiment of FIG. 3 has side webs of different lengths whereby the lips 18' and 20' of the side web 14 project farther from the bottom walls 36 and 37 of the slots 29' and 30'. This structure is especially useful where the slots 29' and 30' are relatively narrow. The zipper strips 34, 34 and the corner strip 34' can be separate, as shown, or they can be integral with one another. In either case, the zipper strip, being harder and less resilient than the body of the H-shaped gasket, provides a high pressure along the edges of the H-shaped gasket through the lips which project diagonally toward one another at the outer edges of the slots.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An elastomer, corner portion of a gasket for sealing right angle corners of a rectangular panel-like member which comprises an elastomer gasket having a pair of elastomer legs at a substantially right angle to each other, each leg having an elastomer cross web intersecting the other cross web at a substantially right angle, a pair of spaced elastomer side webs extending at substantially right angles from opposite sides of each cross web, said cross webs and their respective side webs defining a first corner slot in said legs along the inner corner of said corner portion and a second corner slot along the outer corner of said corner portion, the respective slots being on opposite sides of said cross web with the latter as the respective bottom wall thereof, whereby the said respective slots have bottom walls with right angle corners, said side webs having inwardly sloping, outer wall portions along their longitudinal edges providing relatively sharp-edged lips at the outer edges of said slots, and said outer wall portions of said legs at the intersections thereof being curved around the corner formed at said intersection to provide radius curves along the relatively sharp-edged lips at said intersection, the outer surface of said side webs on one side of said corner portion having opposite said cross-webs a lobed-walled slot with a right angle corner therein, said lobed-walled slot adapted to receive substantially matingly lobed, removable zipper strip means therein.

2. An elastomer, corner portion as claimed in claim 1, and a right angled, substantially matingly lobed-walled zipper strip mounted in said lobed-walled slot with a right angled corner therein.

References Cited by the Examiner

UNITED STATES PATENTS

| | | | |
|---|---|---|---|
| 2,189,138 | 2/1940 | Eichner | 52—208 |
| 2,547,799 | 4/1951 | Wernig. | |
| 2,878,535 | 3/1959 | Bush | 52—208 X |
| 3,009,216 | 11/1961 | Kimber | 52—403 X |

HARRISON R. MOSELEY, *Primary Examiner.*

W. E. HEATON, *Assistant Examiner.*